(No Model.)
E. W. McALLISTER.
PISTON FOR SYRINGES.
No. 329,403. Patented Oct. 27, 1885.
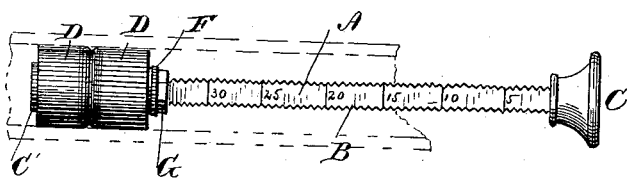
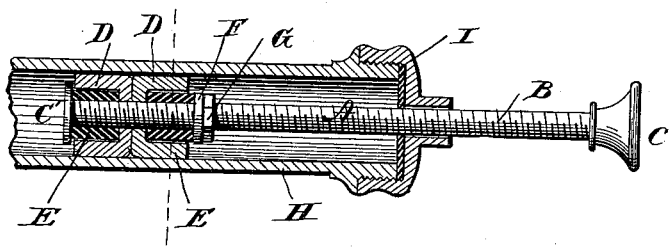
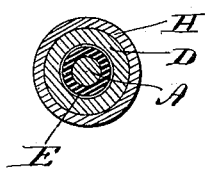
WITNESSES
F. L. Ourand
Wm. Bagger
Elbert W. McAllister,
INVENTOR
by Louis Bagger & Co
Attorneys.

UNITED STATES PATENT OFFICE.

ELBERT W. McALLISTER, OF SOUTH BEND, INDIANA.

PISTON FOR SYRINGES.

SPECIFICATION forming part of Letters Patent No. 329,403, dated October 27, 1885.

Application filed April 27, 1885. Serial No. 163,565. (No model.)

*To all whom it may concern:*

Be it known that I, ELBERT W. MCALLISTER, a citizen of the United States, and a resident of South Bend, in the county of St. Joseph and State of Indiana, have invented certain new and useful Improvements in Pistons for Syringes; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved piston for syringes. Fig. 2 is a longitudinal sectional view of the same, taken on the line *x x* in Fig. 1. Fig. 3 is a transverse sectional view taken on the line *y y* in Fig. 2.

The same letters refer to the same parts in all the figures.

My invention has relation to that class of syringes in which an elastic packing material is used, and has for its object to produce such an instrument that will be simple, effective, and cheap; and it consists in the arrangement and operation of the parts, as will be more particularly described in the specification.

In the drawings hereto annexed, A designates the stem of my improved piston, the upper end of which is screw-threaded through the greater portion of its length, as shown at B, and the upper end of which is provided with a handle, C, by means of which it may be conveniently manipulated. The stem is provided at its lower end with a washer, C, which serves to retain in position the piston, which is composed of a pair of cup-shaped disks, D D, of leather or other suitable material, arranged, as shown, with their ends adjoining each other, and inclosing the sleeves E E, which are constructed of rubber or other suitable elastic and expansive material. Arranged upon the stem A, above the upper sleeve E, is a washer, F, and a nut, G, which latter when tightened serves to expand the sleeves E E within the cup-shaped flexible disks D D, which are thus correspondingly expanded within the tube or barrel, which is designated by letter H. The point or nozzle, which is not shown in the drawings, is to be attached to the lower end of the tube or barrel, and the upper end of the latter is to be closed by the cap I, which is provided with a central perforation, through which the stem A passes.

The operation of this invention will be readily understood from the foregoing description, taken in connection with the drawings hereto annexed. When, owing to wear or from any other cause, the fit of the piston within the tube or barrel has been impaired, it may be rendered perfect by simply tightening the nut G, thus expanding the parts of the piston within the barrel. When the syringe is not in use, the nut G may be loosened, if desired, so as to save the piston. When it is desired to tighten or loosen the nut G, the cap I is unscrewed and the piston drawn up until the nut G is above the top of the barrel, when it can be easily screwed up or down without removing the packing from the barrel, thus avoiding the trouble of replacing it, and also the necessity of handling it. By placing the expanding-nut above the packing the lower part of it is always the same, and when the piston is drawn out a certain distance the same quantity of liquid is drawn into the barrel to be used, which is a desirable feature, and could not be done if the nut were placed below at the end of the piston; nor is it necessary in making new packing to have it exactly of the same thickness as that which it replaces, as the nut G operates the same at any distance from the washer. If the rod had a shoulder, as in most syringes of this class, the packing must be of exactly the same size, or the nut will expand it too much or not enough, without causing the end of the rod to project below it so far as to strike the bottom of the barrel before the liquid has all been ejected.

The construction of the device is simple and inexpensive, and any one of the parts of the piston may be readily replaced in case it shall be injured or worn to such an extent as to render its operation defective.

While this invention is particularly applicable to hypodermic and other medical syringes, where great accuracy and perfection of operation are important, it is obvious that it may be applied with good results to syringes of any kind whatsoever.

I am aware that it is not broadly new to construct a piston for syringes having inverted-cup-shaped disks filled with an elastic material, and I do not claim such construction, broadly; but I am not aware that any means have ever been provided for expanding each of said pieces of packing material at the same time; and I therefore claim and desire to secure by Letters Patent of the United States—

In a piston for syringes, the combination, with a screw-threaded piston-rod having a handle at one end and a washer at the other, of two inverted expansible cup-shaped disks filled with elastic material secured thereon, and a screw-threaded nut fitting said rod above said disks and packing material, and expanding them, substantially as and for the purpose set forth.

In testimony that I claim the foregoing as my own I have hereunto affixed my signature in presence of two witnesses.

ELBERT W. McALLISTER.

Witnesses:
REES J. CHESNUTWOOD,
JASPER E. LEWIS.